(12) United States Patent
Garg

(10) Patent No.: US 9,290,121 B2
(45) Date of Patent: Mar. 22, 2016

(54) COLD-CHARGING TYPE TRUCK BOX/CARGO CONTAINER AND TEMPERATURE-KEEPING BOX

(71) Applicant: Innovation Thru Energy Co., LTD, Tokyo (JP)

(72) Inventor: Pankaj Garg, Tokyo (JP)

(73) Assignee: Innovation Thru Energy Co., Ltd., Marunouchi (JP)

( * ) Notice: Subject to any disclaimer, the term of this patent is extended or adjusted under 35 U.S.C. 154(b) by 116 days.

(21) Appl. No.: 14/329,137

(22) Filed: Jul. 11, 2014

(65) Prior Publication Data

US 2015/0013369 A1 Jan. 15, 2015

(30) Foreign Application Priority Data

Jul. 12, 2013 (TW) .............................. 102125101 A

(51) Int. Cl.
*F25D 3/00* (2006.01)
*B60P 3/20* (2006.01)
*F25D 3/06* (2006.01)
*F25D 15/00* (2006.01)

(52) U.S. Cl.
CPC . *B60P 3/205* (2013.01); *B60P 3/20* (2013.01); *F25D 3/00* (2013.01); *F25D 3/06* (2013.01); *F25D 15/00* (2013.01); *F25D 2303/0844* (2013.01)

(58) Field of Classification Search
CPC ............. F25D 3/06; F25D 15/00; F25D 3/00; F25D 2303/0844; B60P 3/20; B60P 3/205
USPC .......................................... 62/239, 237, 263
See application file for complete search history.

(56) References Cited

U.S. PATENT DOCUMENTS

| 4,505,126 | A | * | 3/1985 | Jones | ...................... | B60P 3/205 280/43.22 |
| 4,748,823 | A | * | 6/1988 | Asano | ..................... | B60H 1/005 62/239 |
| 5,101,643 | A | * | 4/1992 | Hicke | ....................... | B60P 3/20 108/51.11 |
| 5,168,718 | A | * | 12/1992 | Bergmann | ......... | B60H 1/00592 62/244 |
| 5,671,609 | A | * | 9/1997 | Lionetti | ............... | A23B 7/0425 454/118 |
| 6,758,057 | B2 | * | 7/2004 | Vince, II | ............ | B60H 1/00014 62/239 |
| 7,765,824 | B2 | * | 8/2010 | Wong | .................. | B60H 1/3226 62/133 |

(Continued)

*Primary Examiner* — Mohammad M Ali
(74) *Attorney, Agent, or Firm* — Muncy, Geissler, Olds & Lowe, P.C.

(57) ABSTRACT

Disclosed are a cold-charging type truck box/cargo container and a temperature-keeping box, which includes a truck box that includes one or more temperature-keeping chambers and a cold storage chamber arranged to correspond to a top of the temperature-keeping chambers, the cold storage chamber receiving therein one or more cold accumulators, wherein a wall of the truck box corresponding to the cold storage chamber is provided with a connector; and a freezer, which includes a delivery tube and a freezing system, the delivery tube having a first end connected to the freezing system, the delivery tube having a second connected to a fast connector; wherein connection is selectively made between the connector and the fast connector to allow the freezing system to supply cold energy through the delivery tube into the cold storage chamber to freeze the cold accumulators. With freezing of the cold accumulators being completed at every morning, cargos can be transported from a transfer station to a destination. Return is then made back to the transfer station, where a freezer is operated to supply cold energy to the cold storage chamber to freeze the cold accumulators for being ready for use in the next day.

13 Claims, 14 Drawing Sheets

(56) References Cited

U.S. PATENT DOCUMENTS

| | | | | |
|---|---|---|---|---|
| 8,225,622 B2 * | 7/2012 | Uluc | ............. | B64D 13/00 62/244 |
| 2004/0020236 A1 * | 2/2004 | Vince, II | ............. | B60H 1/00014 62/434 |
| 2004/0139757 A1 * | 7/2004 | Kuehl | ............. | B60H 1/00592 62/237 |
| 2011/0138820 A1 * | 6/2011 | Weeth | ............. | F25D 15/00 62/62 |
| 2012/0019020 A1 * | 1/2012 | Wang | ............. | B29C 45/14467 296/24.35 |
| 2012/0192798 A1 * | 8/2012 | Kong | ............. | A01K 63/04 119/226 |

* cited by examiner

COLD-CHARGING TYPE TRUCK BOX/CARGO CONTAINER AND TEMPERATURE-KEEPING BOX

TECHNICAL FIELD

The disclosure relates to a truck box and a cargo container, and in particular to a cold-charging type truck box, cargo container, and temperature-keeping box for use in a cargo box of a truck, a train, or a cargo container.

BACKGROUND

When commodities are shipped through logistic service business, the logistics trucks are generally classified as "refrigeration/freezer tucks" and "ambient temperature trucks"; and a refrigeration/freezer system can be installed in a truck to keep foodstuffs shipped fresh in a low temperature. This is an important link of the logistic business. A regular logistic truck transports commodities in the ambient temperature, while frozen products are shipped with a freezer truck and fresh-kept foodstuffs are shipped with a refrigerator truck. Various types of logistic trucks are provided with various functions for shipping different types of commodities. Technology of ambient temperature trucks or freezer trucks is quite mature and it is generally of no concern about the time of transportation, for the freezer system installed in the truck box or a cargo container is of full capability for commodity transportation. Frozen or fresh-keeping commodities that are shipped with a Styrofoam-made temperature-keeping case is just for an extremely short period of transportation and is incapable of long term transportation. The freezer trucks are commonly used to ship frozen products, such as fishes and meats. The freezer truck include freezer facility and according to the needs for shipping products of different temperatures, the freezer truck can be modified as a logistic truck for transporting fresh-keeping products. Such a fresh-keeping logistic truck is generally used to transport for example vegetables and fruits that must be kept in a temperature between 0° C. and +5°. The freezer facility installed on the logistic truck provides a fresh-keeping temperature that helps keep the fresh-keeping products fresh until reaching the destination.

Logistics is becoming complicated and it requires products of different temperatures to be shipped with the same truck. Under this condition, the truck must be provided with diversified temperature-keeping spaces. The disclosure aims to provide a cold-storage truck for shipping temperature-keeping articles in diversified ways.

SUMMARY

An object of the disclosure is to provide a multiple-temperature temperature-keeping chamber above which one or more cold storage chambers are arranged, wherein the cold storage chamber receives therein one or more cold accumulators, so that with freezing of the cold accumulators being completed at every morning, after cargos have been transported from the transfer station to a destination and return has been made to the transfer station, a freezer is operated to supply cold energy to the cold storage chamber to freeze the cold accumulators for being ready for use in the next day.

Another object of the disclosure is to provide different temperatures by using different numbers of cold accumulators having different freezing temperatures so that the temperature of each temperature-keeping chambers is different to be supplied to cargos requiring different temperatures to thereby achieve shipping of cargos of different temperature with the same truck.

To achieve the above objects, the disclosure provides a cold-charging type truck box/cargo container, which is characterized by comprising: a truck box, which comprises one or more temperature-keeping chambers and a cold storage chamber arranged to correspond to a top of the temperature-keeping chambers, the cold storage chamber receiving therein one or more cold accumulators, wherein a wall of the truck box corresponding to the cold storage chamber is provided with a connector; and a freezer, which comprises a delivery tube and a freezing system, the delivery tube having a first end connected to the freezing system, the delivery tube having a second connected to a fast connector; wherein connection is selectively made between the connector and the fast connector to allow the freezing system to supply cold energy through the delivery tube into the cold storage chamber to freeze the cold accumulators.

In an embodiment, the truck box has a side on which a door panel is mounted and the truck box has a rear end to which a rear door panel is mounted, the door panels respectively corresponding to the temperature-keeping chambers.

In an embodiment, the cold storage chamber comprises a lift door to allow one or more cold accumulators to be deposited into the cold storage chamber.

In an embodiment, the truck box is divided into a first temperature-keeping chamber, a second temperature-keeping chamber, and a third temperature-keeping chamber, the second temperature-keeping chamber and the third temperature-keeping chamber being arranged to juxtapose each other at one side of the first temperature-keeping chamber; the first temperature-keeping chamber is adjacent to one side of the truck box; and the first temperature-keeping chamber is provided with a first door panel, the first door panel being composed of top and bottom door panels, the truck box being provided at a rear end thereof with a second door panel corresponding to the second temperature-keeping chamber; the third temperature-keeping chamber is provided with a third door panel.

In an embodiment, the connector is mounted to a wall of the truck box and in communication with the cold storage chamber.

In an embodiment, a dual-panel transparent glass door is arranged at an inner side of the first door panel of the first temperature-keeping chamber.

In an embodiment, the first end of the delivery tube is connected to an evaporator of the freezing system to allow cold energy generated by the evaporator to be delivered through the delivery tube.

In an embodiment, the truck box comprises a partition board mounted therein to form the a first, a second, and a third temperature-keeping chambers and a cold storage chamber in such a way that the first, second, and third temperature-keeping chambers are located at a lower side, while the cold storage chamber is located above the temperature-keeping chambers; and corresponding to each of the temperature-keeping chambers, the partition board comprises an opening formed therein, the opening comprising a closure member to selectively close the opening.

In an embodiment, each of the cold storage chamber corresponds to each of the temperature-keeping chambers and separation plates are provided with at least one through hole, the through hole comprising a closure member to selectively close the through hole.

Another embodiment of the disclosure relates to a temperature-keeping box, which is characterized by comprising at least one temperature-keeping chambers and at least one cold storage chamber, the cold storage chamber comprising one or more cold accumulators received therein, the cold storage chamber comprising a third connector and a fourth connector corresponding to a temperature-keeping box wall; and a freezer, which comprises a first delivery tube and a second delivery tube, the first delivery tube and the second delivery tube being respectively provided with a first fast connector and a second fast connector for respectively connecting with the third connector and the fourth connector so as to achieve connection with the freezer through the first delivery tube and the second delivery tube.

In an embodiment, the temperature-keeping chamber and the cold storage chamber comprise an intermediate partition board arranged therebetween, the intermediate partition board comprising a plurality of through holes formed therein so that cold energy of the cold accumulators is allowed flow down through the through holes into the temperature-keeping chamber.

In an embodiment, the cold storage chamber of the temperature-keeping box comprises a partition board corresponding to the temperature-keeping chamber to divide the temperature-keeping chamber and the cold storage chamber into two, the partition board comprising a through hole formed therein.

In an embodiment, a pallet is provided under the temperature-keeping box, a push board being provided under the pallet, the push board having an underside to which four casters are mounted for easy moving of the temperature-keeping box.

The disclosure provides a cold-charging station that comprises at least a logistic truck and a logistic station. The logistic truck has two fast connectors respectively connectable to fast connectors of two delivery tubes of an external freezer or a freezer built in the logistic station so that low temperature air of the freezer through the two delivery tube is allowed to move in or out of the cold storage chamber of the logistic truck.

After the freezing operation of the cold accumulator has been completed in every morning and cargos have been shipped from a transfer station to a destination and returning being made back to the transfer station, a freezer is operated to supply cold energy to the cold storage chamber to freeze the cold accumulator for being ready to use in the next day. This achieves that a single truck can be used to transport cargos at different temperatures. For example, a first temperature-keeping chamber is set at +5° C. for shipping milk products.

DETAILED DESCRIPTION OF THE PREFERRED EMBODIMENTS

Embodiments of the disclosure will be described with reference to the attached drawings in order to provide better understanding of the technical features, objects, and efficacies of the disclosure.

Figure 1:
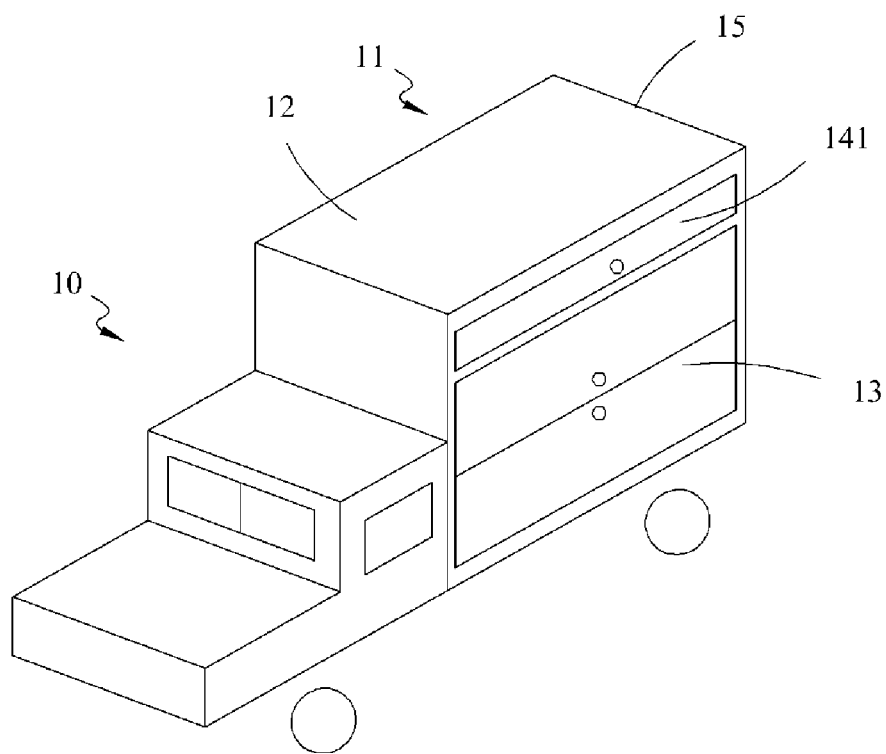
FIG. 1 is a perspective view showing the outside appearance of a multiple-temperature cold-storage truck according to the disclosure.
Figure 2:
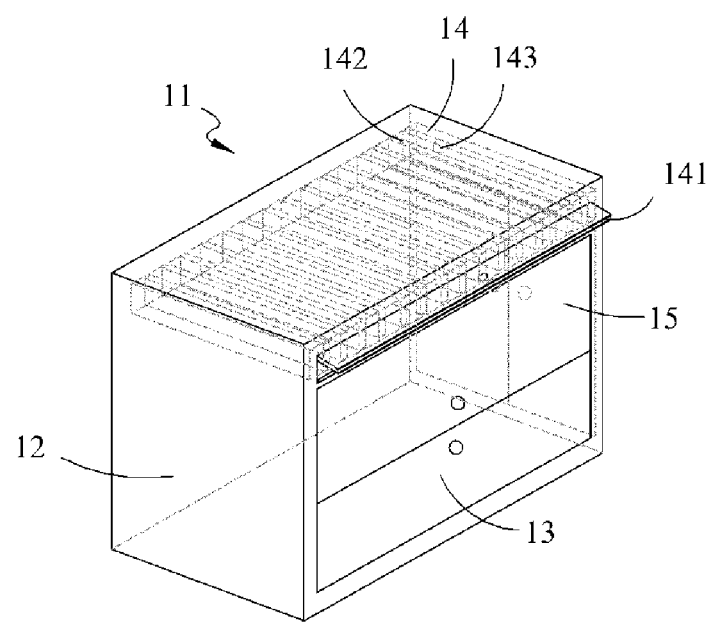
FIG. 2 is a schematic view showing a cold-charging type truck box/cargo container of the disclosure.

Referring to FIGS. 1 and 2, which are respectively a perspective view of an outside appearance of a multiple-temperature cold-storage truck and a schematic view of a cold-charging type truck box/cargo container according to the disclosure, the multiple-temperature cold-storage truck according to the disclosure comprises a truck 10 and a truck box 11. The truck box 11 comprises one or a plurality of temperature-keeping chambers 12 and as shown in FIG. 2, there can be a single one temperature-keeping chamber or multiple temperature-keeping chambers, this being the scope of protection to be sought according to the inventive idea of the disclosure, which is, of course, not limited by the specific number used. The truck box 11 is fixable on a loading deck of the truck 10. For example, the truck box 11 has a bottom on which projection pegs (not shown) are formed for being positioned in positioning holes (not shown) defined in the loading deck of the truck 10, this being generally known and further description being omitted therein. Alternatively, for example, the truck box 11 is provided with holes (not shown) at locations close to the bottom thereof for receiving forks of a forklift to insert therein to lift up the truck box 11 to allow the projection pegs on the bottom of the truck box 11 to be positioned into the positioning holes of the loading deck. In an embodiment, for example, a cargo container is lifted and moved by a crane so as to allow the cargo container to be positioned on a loading deck of a truck, this being of a structure and function similar to the previous embodiment. On the other hand, for example, the truck box 11 is provided with positioning holes in a bottom thereof for being positioned on projection pegs formed on a loading deck of the truck 10. Alternatively, for example, the truck box 11 is provided with holes at locations close to the bottom thereof for receiving forks of a forklift to insert therein to lift up the truck box 11 to allow the positioning holes in the bottom of the truck box 11 to be positioned on the projection pegs of the loading deck. In an embodiment, for example, a cargo container is lifted and moved by a crane so as to allow the cargo container to be positioned on a loading deck of a truck, this being of a structure and function similar to the previous embodiment. This is generally known and further description will be omitted therein.

The truck box 11 has a side on which a door panel 13 is mounted or the truck box 11 has a rear end to which a rear door panel 15 is mounted so that by opening the rear door panel 15, cargos can be deposited in the temperature-keeping chamber 12.

A cold storage chamber 14 is arranged on the top of the temperature-keeping chamber 12 of the truck box 11 and a lift door 141 is provided to correspond to the cold storage chamber 14 so that by lifting the lift door 141, one or more cold accumulators 142 can be deposited into the cold storage chamber 14.

Figure 3:
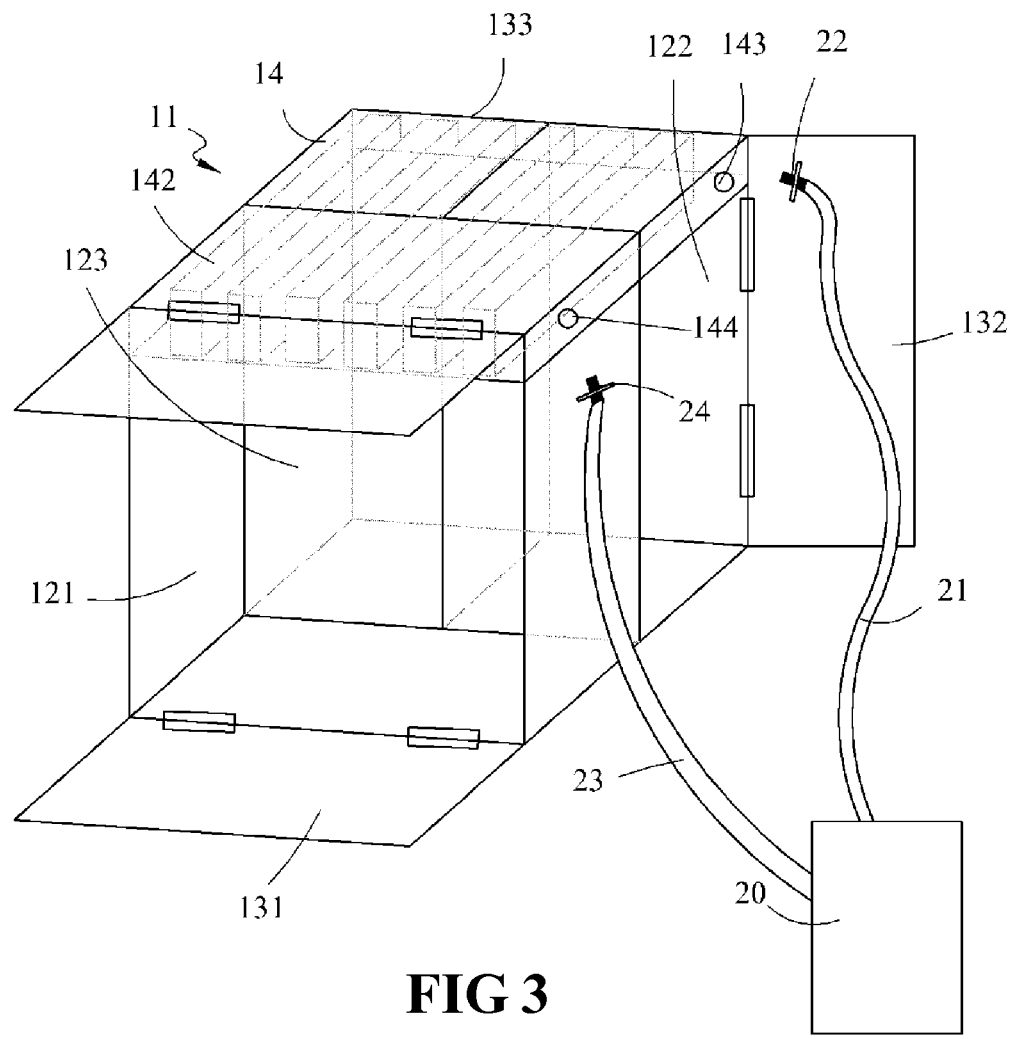
FIG. 3 is a schematic view showing a cold-charging type truck box/cargo container according to a first embodiment of the disclosure.

Referring to FIG. 3, which is a schematic view of a cold-charging type truck box/cargo container according to a first embodiment of the disclosure, the truck box 11 is divided into a first temperature-keeping chamber 121, a second temperature-keeping chamber 122, and a third temperature-keeping chamber 123. The second temperature-keeping chamber 122 and the third temperature-keeping chamber 123 are arranged to juxtapose each other at one side of the first temperature-keeping chamber 121. The first temperature-keeping chamber 121 is adjacent to one side of the truck box 11. For easing deposition of fresh-keeping articles or cargos, the first temperature-keeping chamber 121 is provided with a first door panel 131; the first door panel 131 can alternatively be composed of top and bottom door panels. The truck box 11 is further provided, at the rear end thereof, with a second door panel 132 corresponding to the second temperature-keeping chamber 122 to facilitate pickup and deposition of cargos by opening the rear door. In an embodiment, the second door panel 132 is composed of a single door panel. The third temperature-keeping chamber 123 is provided with a third door panel 133. The second door panel 132 and the third door panel 133 can be opened and closed individually for deposition/pickup of cargos in the second temperature-keeping chamber 122 and the third temperature-keeping chamber 123. The first door panel 131, the second door panel 132, and the third door panel 133 are each provided with an opening/closing assembly (not shown), for example a handle and a lock, this being generally known and further description being omitted therein. The opening/closing assemblies control locking and unlocking of the first door panel 131, the second door panel 132, and the third door panel 133.

The first temperature-keeping chamber 121, the second temperature-keeping chamber 122, and the third temperature-keeping chamber 123 are each provided, at the top thereof, with one or more cold storage chambers 14 to respectively correspond to the first temperature-keeping chamber 121, the second temperature-keeping chamber 122, and the third temperature-keeping chamber 123. Each of the cold storage chambers 14 comprises one or more cold accumulators 142 arranged therein to provide the interiors of the first temperature-keeping chamber 121, the second temperature-keeping chamber 122, and the third temperature-keeping chamber 123 with different temperatures. The inventive idea of the disclosure is that every morning, after the operations of freezing the cold accumulators have been completed, cargos are transported from a transfer station to a destination and then return is made back to the transfer station and afterwards, a freezer is operated to supply cold energy to the cold storage chamber 14 to proceed with freezing of the cold accumulators for use in the next day. This achieves that a single truck can be used to transport cargos at different temperatures. For example, the first temperature-keeping chamber is set at +5° C. for shipping milk products and fresh vegetables/fruits; the second temperature-keeping chamber is set at −5° C. for shipping frozen foods; and the third temperature-keeping chamber is set at −15° C. for shipping frozen food products. The inventive idea of the disclosure can also be extended to cover the arrangement that the temperature-keeping chambers receive no cold accumulators therein at all for shipping products in the ambient temperature.

The first temperature-keeping chamber 121, the second temperature-keeping chamber 122, and the third temperature-keeping chamber 123 can be selectively set as regular temperature chambers or refrigeration chambers or freezing chambers according to the needs to correspondingly ship various cargos, such as fruits, vegetables or frozen foods or electronic components.

The cold storage chamber 14 has a wall to which a first connector 143 and a second connector 144 are mounted. For example, as shown in FIG. 3, the first connector 143 and the second connector 144 are mounted above a rear wall of the truck box and are in communication with the cold storage chamber 14. The first connector 143 and the second connector 144 can be female connectors of fast connector assemblies. The freezer 20 comprises a freezing system (not shown) and a first delivery tube 21 and a second delivery tube 23. The first delivery tube 21 has a first end connected to an evaporator of the freezing system so that the cold energy generated by the evaporator is delivered through the first delivery tube 21. The first delivery tube 21 has a second end provided with a first fast connector 22, such as a male connector of the fast connector assembly. Thus, after the logistic truck has completed the delivery of cargos and has returned back to the transfer station, it being often leaving in the morning to deliver cargos and returning at the afternoon or at night, the cold energy of the cold accumulator 142 of the cold storage chamber 14 of the logistic truck has been generally consumed up and the interior temperature has risen. Thus, for use in the next day, the first fast connector 22 of the first delivery tube 21 of the freezer 20 can be connected to the first connector 143 of the logistic truck to deliver cold energy into the cold storage chamber 14 to freeze the cold accumulator 142 until the next morning. To allow the cold air inside the cold storage chamber 14 to circulate and continuously supply fresh cold air, the first end of the second delivery tube 23 is connected to the freezer 20 and air that has been subject to heat exchange is discharged to the outside of the freezer 20. The second end of the second delivery tube 23 is connected to a second fast connector 24. When the second fast connector 24 is connected to the second connector 144, the cold air inside the cold storage chamber 14 that has been subject to heat exchange is discharged through the second delivery tube 23 to the outside. In other words, when the first fast connector 22 is connected to the first connector 143 and the second fast connector 24 is connected to the second connector 144, external air passes through the evaporator of the freezer 20 and flows through the first delivery tube 21 into the cold storage chamber 14 to proceed with heat exchange with the cold accumulators 142 and is then discharged through the second delivery tube 23 to the outside. The cold storage chambers 14 arranged on the tops of the first temperature-keeping chamber 121, the second temperature-keeping chamber 122, and the third temperature-keeping chamber 123 are provided with through holes for communication with each other. The first temperature-keeping chamber 121, the second temperature-keeping chamber 122, and the third temperature-keeping chamber 123 are also provided with through holes to communicate with the corresponding cold storage chambers 14 on the tops thereof. Further details will be given hereinafter.

The freezer 20 comprises a large power compressor. The freezer 20 comprises a freezing system and the freezing system comprises the compressor, a condenser, an expansion device, and the evaporator and is suitable for generating and delivering cooling air of low temperature between −80° C. and −40° C.

As shown in FIG. 3, the cold storage chamber 14 is divided into different cold storage chambers according to each temperature-keeping chambers 121, 122, 123. According to different temperature setting, each cold storage chamber is provided with a different number of cold accumulators disposed in the cold storage chamber. The cold storage chambers can be set in communication with each other by opening air passages therebetween so that the cold energy supplied by having the first fast connector 22 of the first delivery tube 21 connected to the first connector 143 can be conducted into each cold storage chamber to freeze the cold accumulators. During the freezing process, the second fast connector 24 of the second delivery tube 23 is put in connection with the second connector 144 to deliver the air that has been subject to heat exchange to the outside. Under this condition, the air passages between the cold storage chambers can be closed. The air passages can be designed in the openable/closable arrangement shown in FIG. 7 or 8.

The internal freezing circulation system of the freezer 20 comprises airflow channels that are arranged according to the locations of the evaporator and the condenser. External air flows through the airflow channels to be subject to temperature lowering by the evaporator and is then delivered by the first delivery tube 21 into the cold storage chamber 14. After heat exchange with the cold accumulators 142, the cold air is delivered by the second delivery tube 23 to the condenser of the freezer 20 and then is allowed to flow through the airflow channels to the outside of the freezer 20. The freezer 20 is generally known and no further detail will be given herein.

Figure 4:
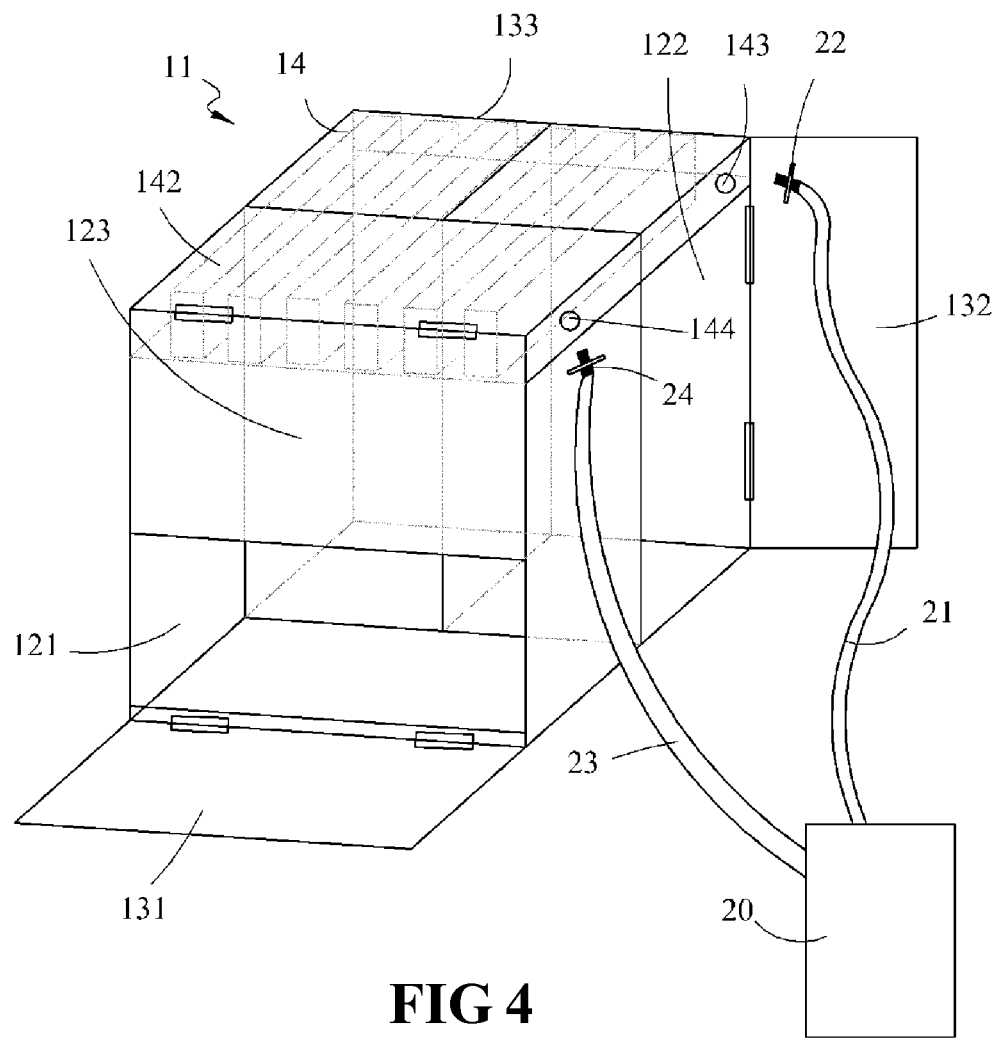
FIG. 4 is a schematic view showing a cold-charging type truck box/cargo container according to a second embodiment of the disclosure.

Referring to FIG. 4, which is a schematic view of a cold-charging type truck box/cargo container according to a second embodiment of the disclosure, the truck box 11 is structurally similar to what shown in FIG. 3 and further description will be omitted here. The truck box 11 is modified to make the first temperature-keeping chamber 121 an exhibition cabinet, whereby products can be readily accessed and displayed by closing an upper panel of the first door panel 131 and opening a lower panel. If the first temperature-keeping chamber 121 is set to be a regular temperature chamber, then the cold storage chamber 14 on the top thereof can be deactivated to prevent cold energy to flow downwards therefrom.

In an embodiment, the truck box 11 shown in FIGS. 3 and 4 can be a cargo container or a temperature-keeping box.

Figure 5:
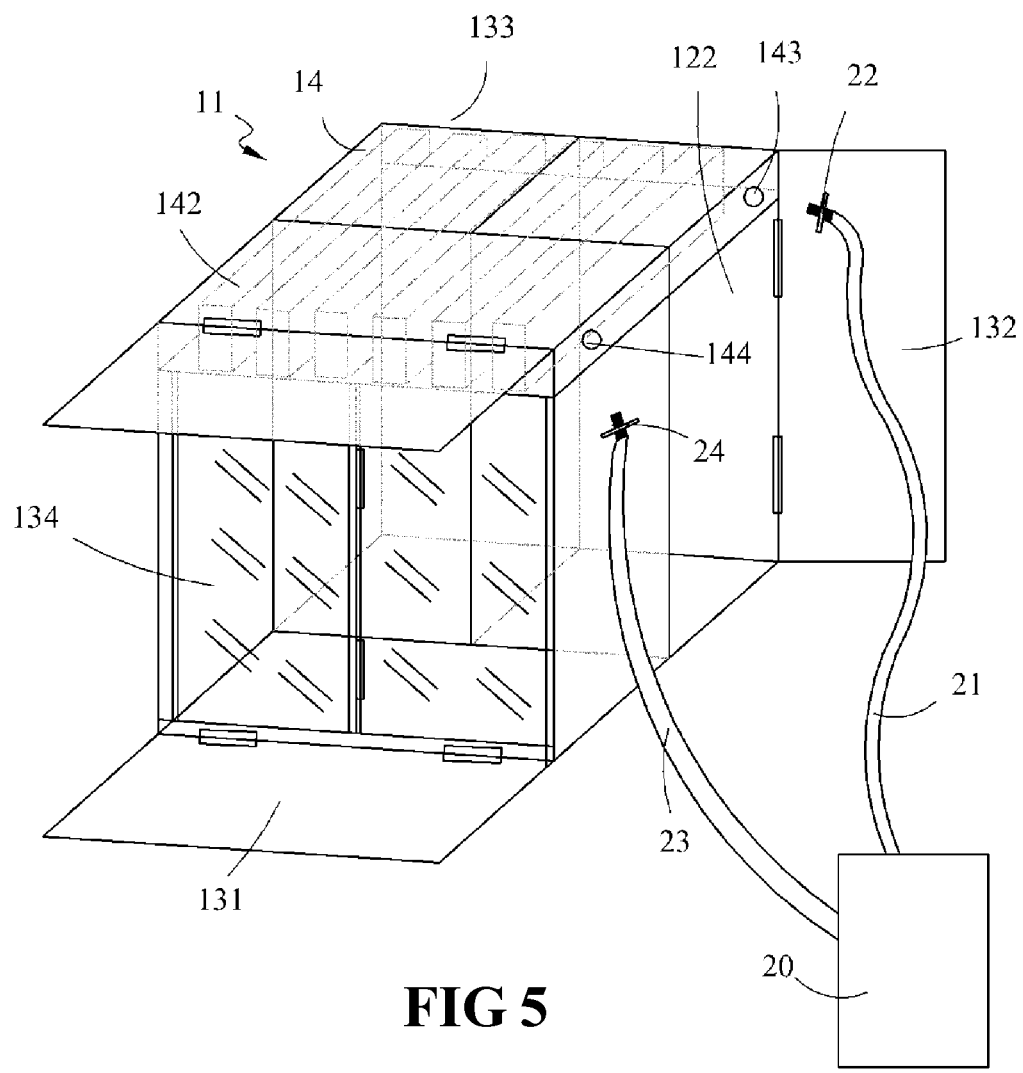
FIG. 5 is a schematic view showing a cold-charging type truck box/cargo container according to a third embodiment of the disclosure.

Referring to FIG. 5, which is a schematic view of a cold-charging type truck box/cargo container according to a third embodiment of the disclosure, the truck box 11 is structurally similar to what shown in FIG. 3 and a difference is that the a dual-panel transparent glass door 134 is arranged at an inner side of the first door panel 131 of the first temperature-keeping chamber 121 to allow movement in opposite directions for opening or closing. With the arrangement of the transparent glass door 134, the first temperature-keeping chamber 121 can serve as a refrigeration chamber and may be used as an exhibition chamber for exhibiting refrigerated products, such as fresh vegetables/fruits, fishes and meats, and beverages. Alternatively, the first temperature-keeping chamber 121 can serve as a freezing chamber and used as an exhibition chamber for exhibiting frozen products, such as frozen fishes and meats. The second temperature-keeping chamber 122 and the third temperature-keeping chamber 123 can be arranged for other purposes, such as serving as freezing chambers or regular temperature chambers or temperature-keeping chambers of different temperatures.

When the logistic truck has completed cargo shipment and has returned back to the transfer station, it being often leaving in the morning to deliver cargos and returning at the afternoon or at night, the cold energy of the cold accumulator 142 of the cold storage chamber 14 of the logistic truck has been generally consumed up and the interior temperature has risen. Thus, for use in the next day, the first fast connector 22 of the first delivery tube 21 of the freezer 20 can be connected to the first connector 143 of the logistic truck to deliver cold energy into the cold storage chamber 14 to freeze the cold accumulator 142 until the next morning. During the freezing process, the air that has been subject to heat exchange is delivered by the second fast connector 24 of the second delivery tube 23 connected with the second connector 144 to the outside.

Figure 6:
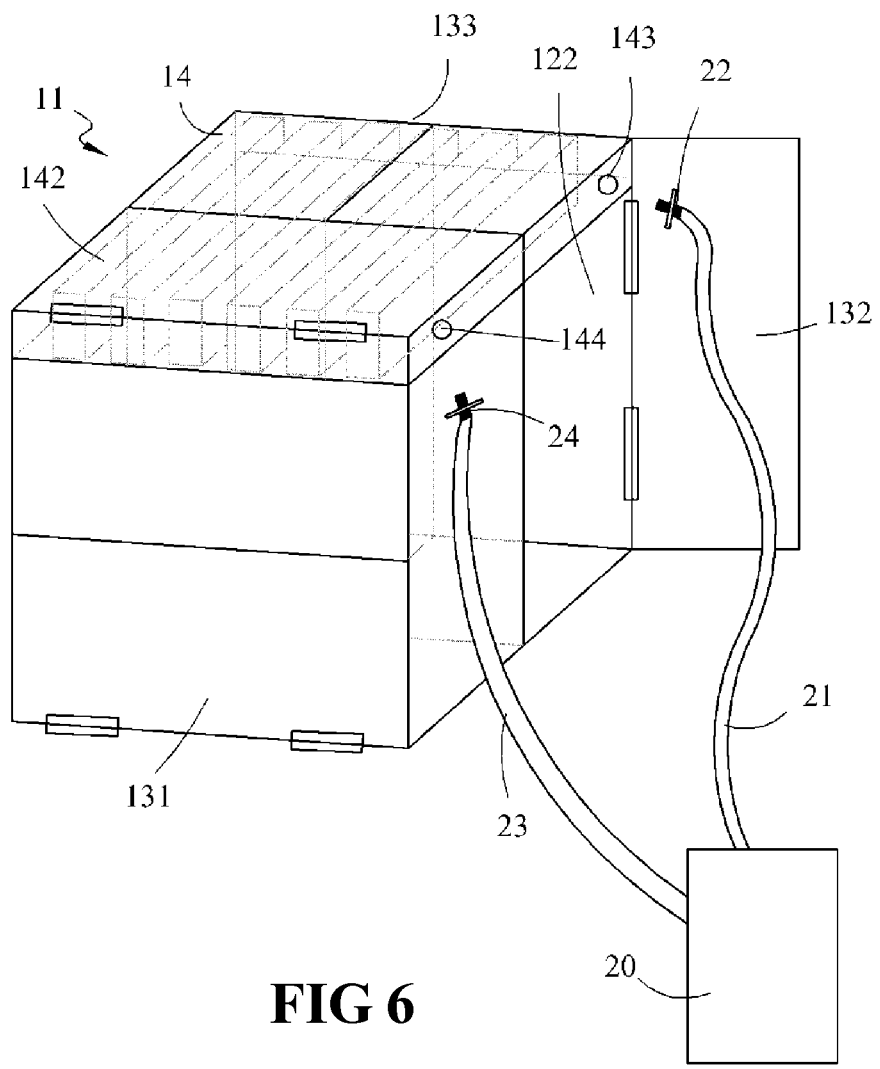
FIG. 6 is a schematic view showing a cold-charging type truck box/cargo container according to a fourth embodiment of the disclosure.

Referring to FIG. 6, which is a schematic view showing a cold-charging type truck box/cargo container according to a fourth embodiment of the disclosure, the truck box 11 is structurally similar to what shown in FIG. 5 and a difference is that the conditions of user are different. When the logistic truck has completed cargo shipment and has returned back to the transfer station, the cold energy of the cold accumulator 142 of the cold storage chamber 14 of the logistic truck has been generally consumed up and the interior temperature has risen. Thus, the first door panel 131 can be closed and the second door panel 132 is opened to remove products therefrom for being stored at other sites. For being ready to use in the next day, the first fast connector 22 of the first delivery tube 21 of the freezer 20 is connected to the first connector 143 of the logistic truck to deliver cold energy into the cold storage chamber 14 to freeze the cold accumulator 142 until the next morning. During the freezing process, the second fast connector 24 of the second delivery tube 23 is set in connection with the second connector 144 to deliver the air that has been subject to heat exchange to the outside. Under this condition, when the freezing operation is completed, the products can be moved back into each temperature-keeping chamber of the truck box 11 for subsequent delivery.

In an embodiment, the truck box 11 shown in FIGS. 5 and 6 can be a cargo container or a temperature-keeping box.

Figure 7:
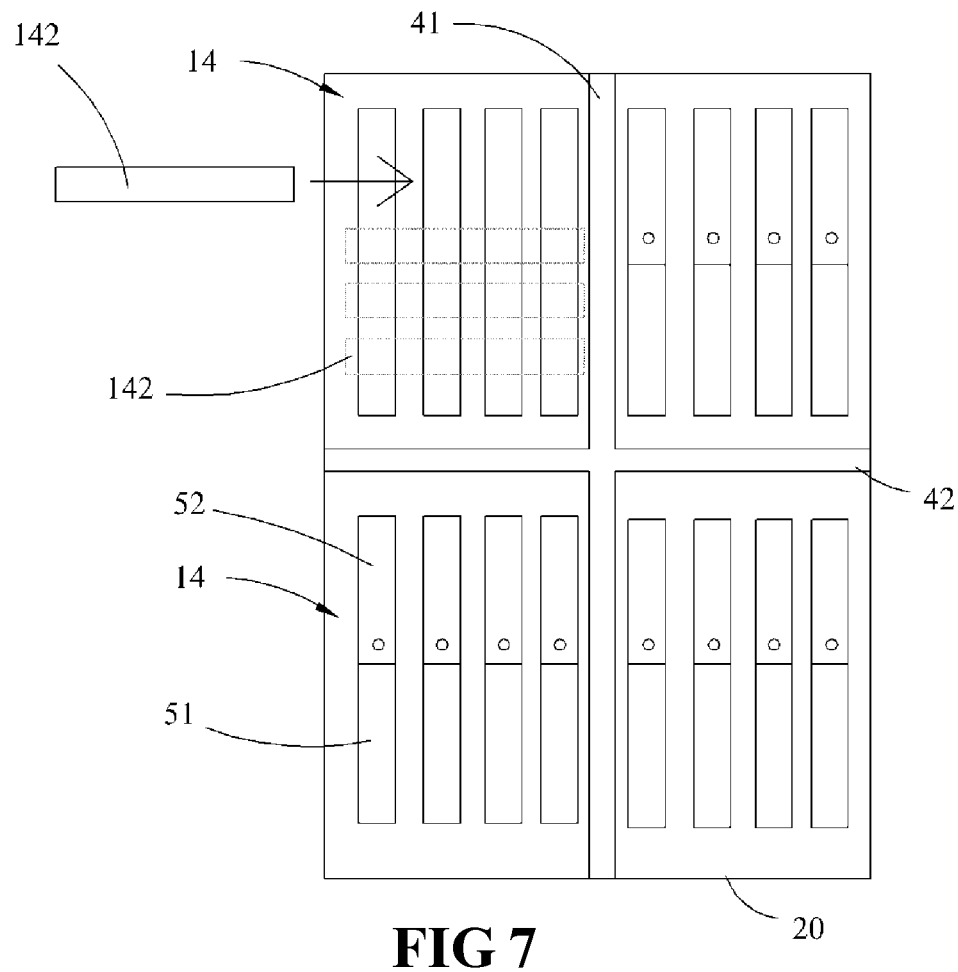
FIG. 7 is a schematic view showing a temperature-keeping chamber of the cold-charging type truck box/cargo container according to the disclosure.
Figure 8:
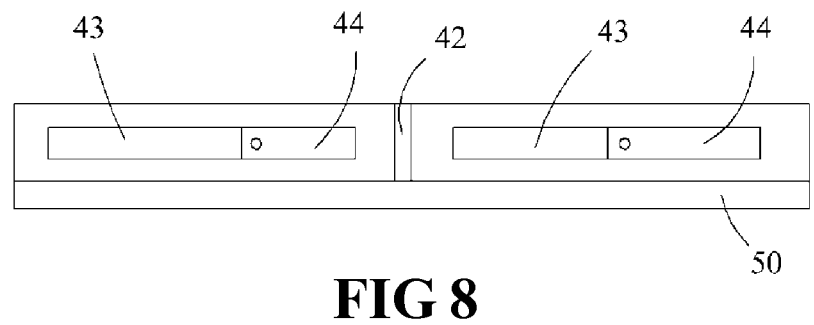
FIG. 8 is a schematic view showing a lift door of the cold-charging type truck box/cargo container according to the disclosure.

Referring to FIGS. 7 and 8, which are schematic views respectively showing a temperature-keeping chamber and a lift door of the cold-charging type truck box/cargo container according to the disclosure, the truck box 11 comprises a partition board 50 mounted therein to form the first, second, and third temperature-keeping chambers 121, 122, 123 and the cold storage chamber 14 in such a way that the first, second, and third temperature-keeping chambers 121, 122, 123 are located at the lower side, while the cold storage chamber 14 is at the upper side. The cold storage chamber 14 comprises at least one cold accumulators 142, wherein corresponding to each of the temperature-keeping chambers, the partition board 50 comprises an opening 51 formed thereon, as shown in FIG. 7. The opening 51 comprises a closure member 52 that can closes the opening 51. The closure member 52 is a plate that is movable leftward or rightward to open or close the opening 51, whereby the first, second, and third temperature-keeping chambers 121, 122, 123 and the cold storage chamber 14 can be set in communication with each other or blocked with respect to each other to realize flow of the cold energy of the cold accumulators 142. When the closure member 52 is open, the cold energy of the cold accumulators 142 is allowed to flow downward. Oppositely, when the closure member 52 closes the opening 51, the cold energy of the cold accumulators 142 is prohibited from flowing downward and fresh-keeping of food in ambient temperature or other temperatures can be effected. The box wall and the separation plates of the disclosure are all made of a thermal insulation material or plates that comprise a thermal insulation material filled therein.

In an embodiment, the truck box 11 comprises therein a plurality of separation plates 41, 42 that divide a plurality of cold storage chambers 14 and temperature-keeping chambers (not shown), and as shown in FIG. 7, four cold storage chambers are formed. Each cold storage chamber may receive therein at least one cold accumulator 142 or no cold accumulator at all. Each of the cold storage chambers is arranged to correspond to each of temperature-keeping chambers and the separation plates 41, 42 are provided with at least one through hole 43. Each of the through holes 43 is provided with a closure member 44 that selectively closes the through hole 43. The closure member 44 comprises a plate that can opens and closes the through hole 43 to allow the cold storage chamber and the cold storage chamber to communicate with each other or to be blocked from each other to selectively allow cold energy to flow therebetween.

To facilitate removal or deposition of the cold accumulators 142, the truck box 11 is provided with a lift door 141 corresponds to the cold storage chamber 14. The cold storage chamber 14 may be provided therein with a support structure (not shown) to receive the cold accumulators 14 to dispose thereon and the partition board 50 can support the cold accumulators 142 thereon.

The truck box 11 and box walls, the partition board 50, the separation plates 41, 42 and the closure members 44, 52 can be made of a thermal insulation material so that the temperatures of the cold storage chamber 14 and the temperature-keeping chambers do not mix with each other and transportation spaces having different temperatures can be defined to achieve the purpose of multiple-temperature transportation.

In an embodiment, the truck box 11 shown in FIGS. 7 and 8 can be a cargo container or a temperature-keeping box.

Figure 9:
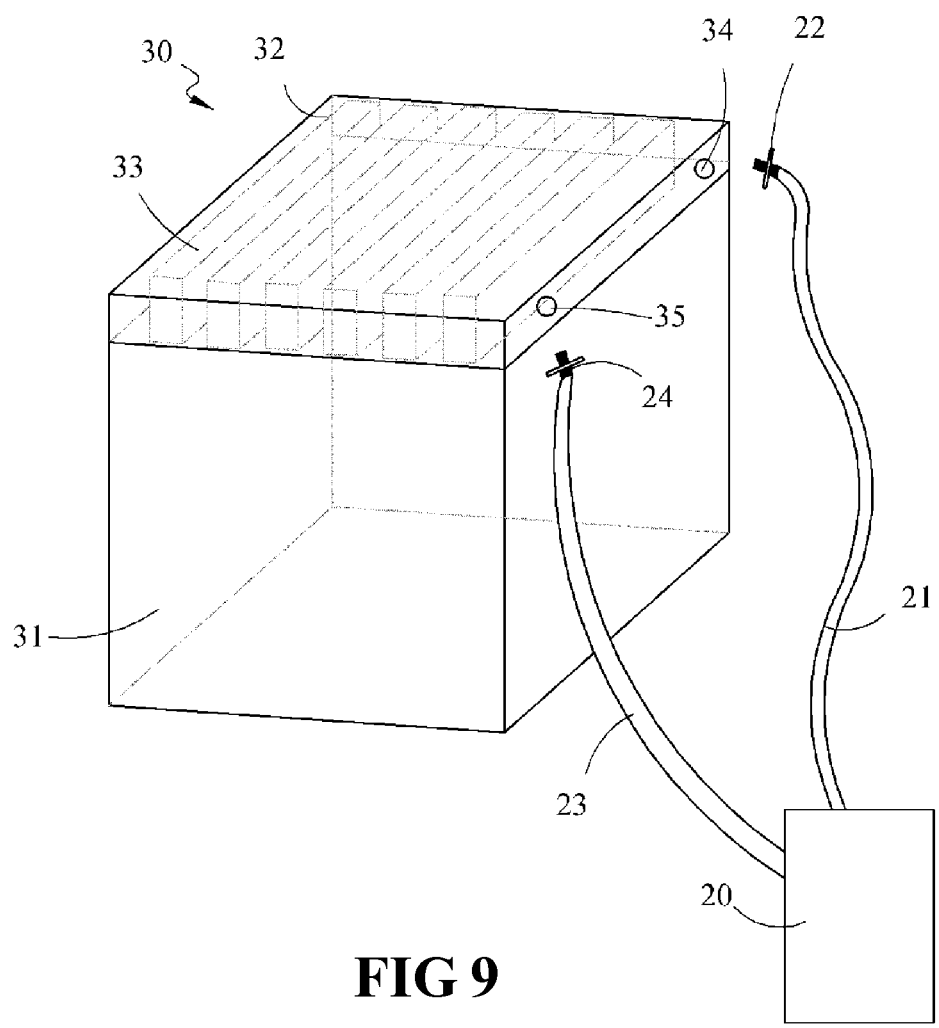
FIG. 9 is a schematic view showing a temperature-keeping box of the cold-charging type truck box/cargo container according to the disclosure.

Referring to FIG. 9, which is a schematic view showing a temperature-keeping box of the cold-charging type truck box/cargo container according to the disclosure, each logistic truck can carry one or more temperature-keeping boxes 30. Each of the temperature-keeping boxes 30 comprises a temperature-keeping chamber 31 and a cold storage chamber 32. The cold storage chamber 32 receives therein one or more cold accumulators 33 therein. The cold storage chamber 32 comprises a third connector 34 and a fourth connector 35 corresponding to a temperature-keeping box wall. A freezer 20 comprises a first delivery tube 21 and a second delivery tube 23. The first delivery tube 21 and the second delivery tube 23 are respectively provided with a first fast connector 22 and a second fast connector 24. The third connector 34 and the fourth connector 35 are respectively connectable to the first fast connector 22 and the second fast connector 24 so that connection to the freezer 20 is made through the first delivery tube 21 and the second delivery tube 23.

When the logistic truck has completed cargo shipment and has returned back to the transfer station, the cold energy of the cold accumulator 33 of the cold storage chamber 32 of the temperature-keeping box 30 has been generally consumed up and the interior temperature has risen. Thus, the temperature-keeping box 30 can be opened to remove products for being stored at other sites (or a vacant box). For being ready to use in the next day, the first fast connector 22 of the first delivery tube 21 of the freezer 20 is connected to the first connector 34 of the temperature-keeping box 30 to deliver cold energy into the cold storage chamber 32 to freeze the cold accumulator 33 until the next morning. During the freezing process, the second fast connector 24 of the second delivery tube 23 is set in connection with the second connector 35 to deliver the air that has been subject to heat exchange to the outside. Under this condition, when the freezing operation is completed, the products can be moved back into each temperature-keeping box of the truck box 11 for subsequent delivery.

Figure 10:
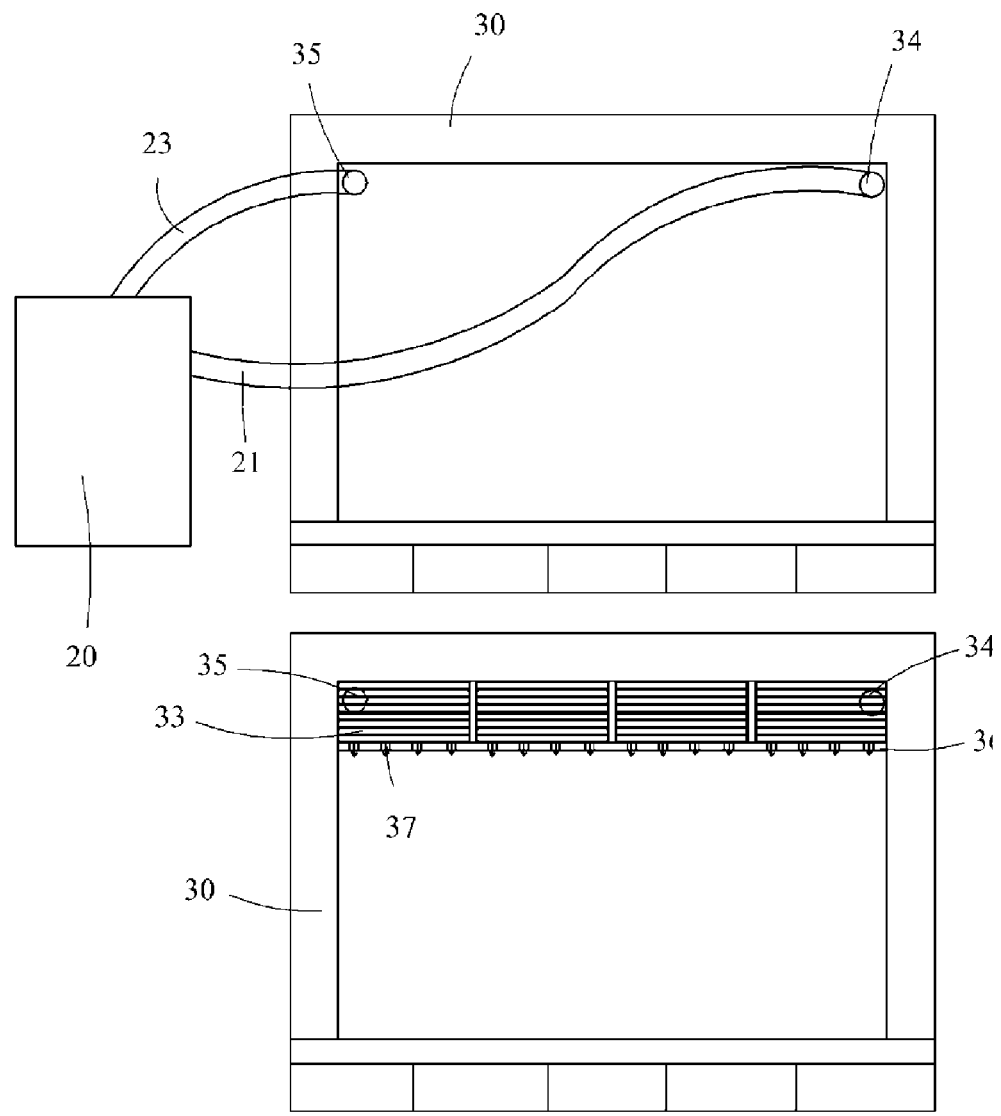
FIG. 10 is a schematic cross-sectional view of the temperature-keeping box of the cold-charging type truck box/cargo container according to the disclosure.

Referring to FIG. 10, which is a schematic cross-sectional view of the temperature-keeping box of the cold-charging type truck box/cargo container according to the disclosure, the cold storage chamber 32 of the temperature-keeping box 30 comprises a third connector 34 and a fourth connector 35 corresponding to a temperature-keeping box wall. The third connector 34 and the fourth connector 35 are respectively connectable to the first fast connector of the first delivery tube 21 and the second fast connector of the second delivery tube 23 so that connection can be made through the first delivery tube 21 and the second delivery tube 23 to the freezer 20.

The temperature-keeping box 30 comprises a temperature-keeping chamber 31 and a cold storage chamber 32. The cold storage chamber 32 receives therein one or more cold accumulators 33 therein. The cold storage chamber 32 comprises a third connector 34 and a fourth connector 35 corresponding to a temperature-keeping box wall. An intermediate partition board 36 is arranged between the temperature-keeping chamber 31 and the cold storage chamber 32 and the intermediate partition board 36 comprises a plurality of through holes 37 formed therein to allow the cold energy of the cold accumulators 33 to flow down through the through hole 37 to the temperature-keeping chamber 31. The through holes 37 can be of a design shown in FIG. 7, comprising closure members (not shown) to close or open the through holes 37.

Figure 11:
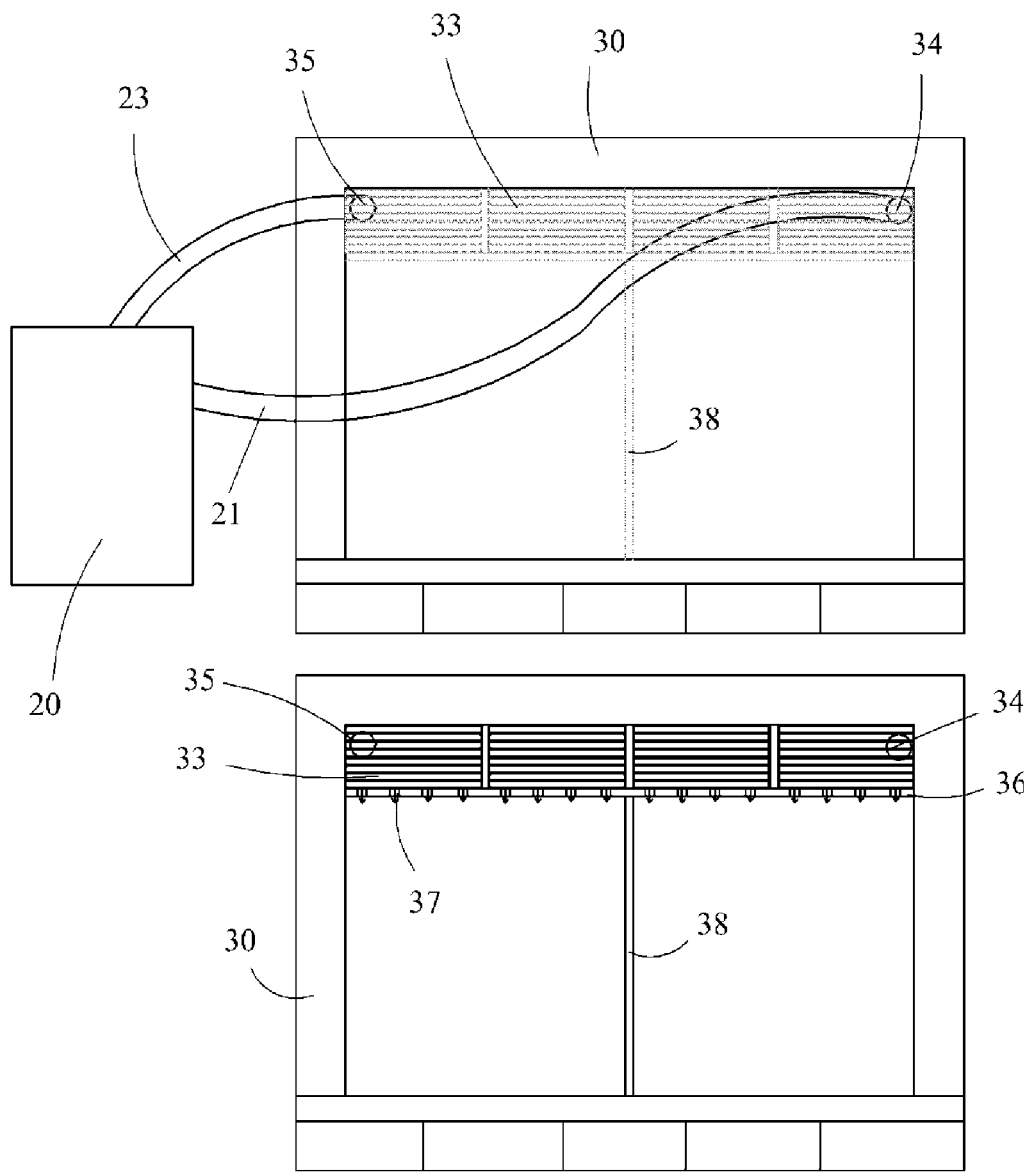
FIG. 11 is a schematic cross-sectional view showing a temperature-keeping box of the cold-charging type truck box/cargo container according to another embodiment of the disclosure.

Referring to FIG. 11, which is a schematic cross-sectional view showing a temperature-keeping box of the cold-charging type truck box/cargo container according to another embodiment of the disclosure, the instant embodiment is structurally similar to that of FIG. 10 and repeated description will be omitted. A difference between the instant embodiment and that of FIG. 10 is that the cold storage chamber 32 of the temperature-keeping box 30 comprises a partition board 38 corresponding to the temperature-keeping chamber 31 for dividing the temperature-keeping chamber 31 and the cold storage chamber 32 into two for providing different temperatures for foodstuffs. The partition board 38 may be provided with through holes 37, which can be of the same design as that shown in FIG. 7 comprising closure member (not shown) to close or open the through holes 37.

Figure 12:
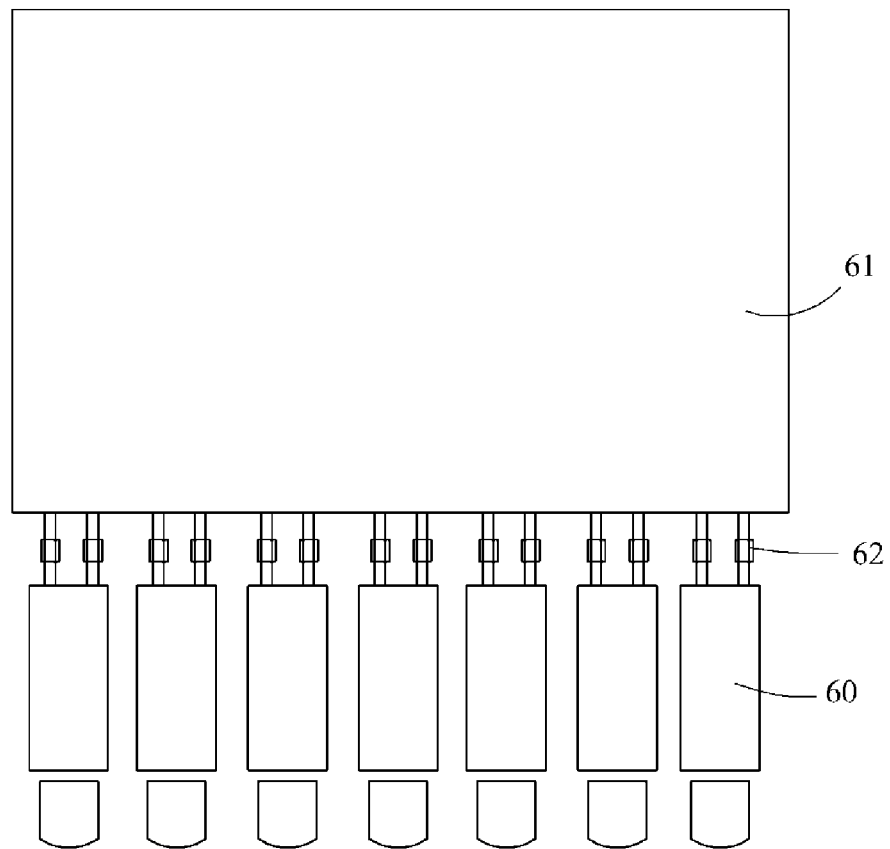
FIG. 12 is a schematic view illustrating cold charging of a logistic truck carrying the cold-charging type truck box/cargo container according to the disclosure.

Referring to FIG. 12, which is a schematic view illustrating cold charging of a logistic truck carrying the cold-charging type truck box/cargo container according to the disclosure, after each logistic truck 60 has completed shipment of cargo and has returned back to the logistic station 61, the two fast connectors 62 of the logistic truck 60 are respectively connected to the fast connectors 62 of two delivery tubes of a freezer or those of the freezer of the logistic station 61 so that low temperature air can be supplied through the two delivery tubes to the cold storage chamber of the logistic truck 60.

Figure 13:
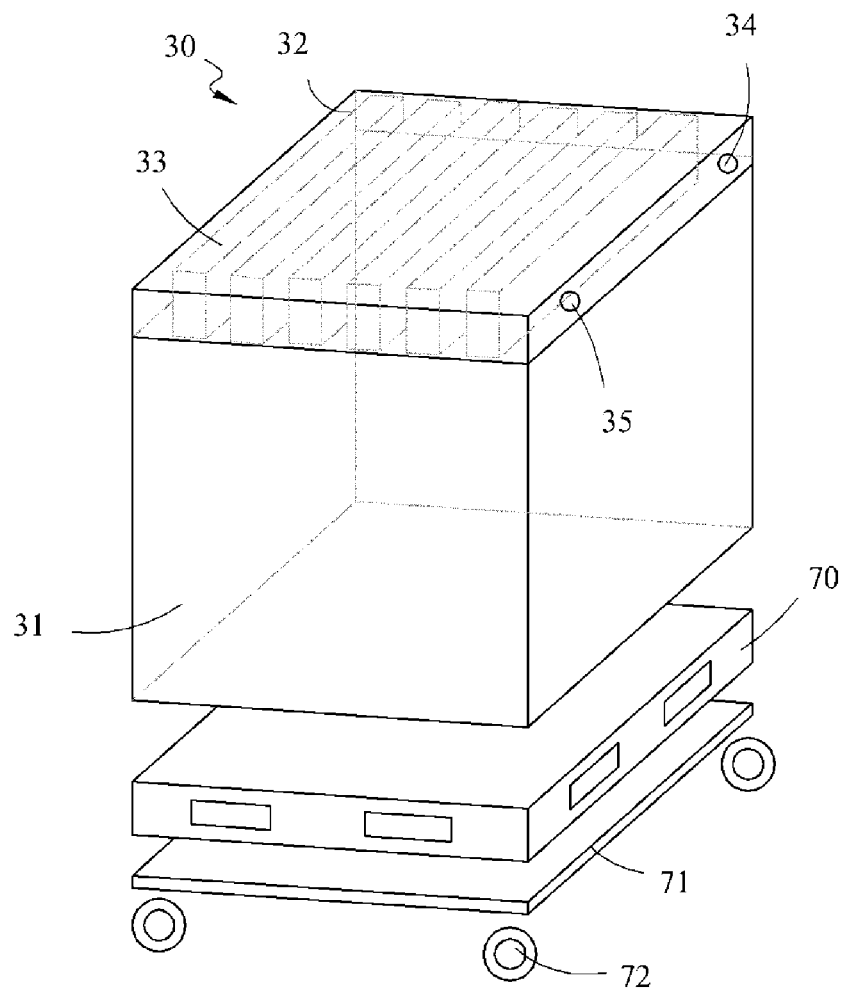
FIG. 13 is a schematic view showing the temperature-keeping box of the cold-charging type truck box/cargo container according to the disclosure and a push board.

Referring to FIG. 13, which is a schematic view showing the temperature-keeping box of the cold-charging type truck box/cargo container according to the disclosure and a push board, the temperature-keeping box 30 is the same as that shown in FIG. 9 and the structure of the temperature-keeping box 30 is also the same as the structure shown in FIG. 9, so that repeated description will be omitted here. The temperature-keeping box 30 is provided, on the underside thereof, with a pallet 70 and a push board 71 is provided under the pallet 70. The push board 71 has an underside to which four casters 72 are mounted for easy moving of the temperature-keeping box 30. The temperature-keeping box 30 can be replaced by a cage cart.

Figure 14:
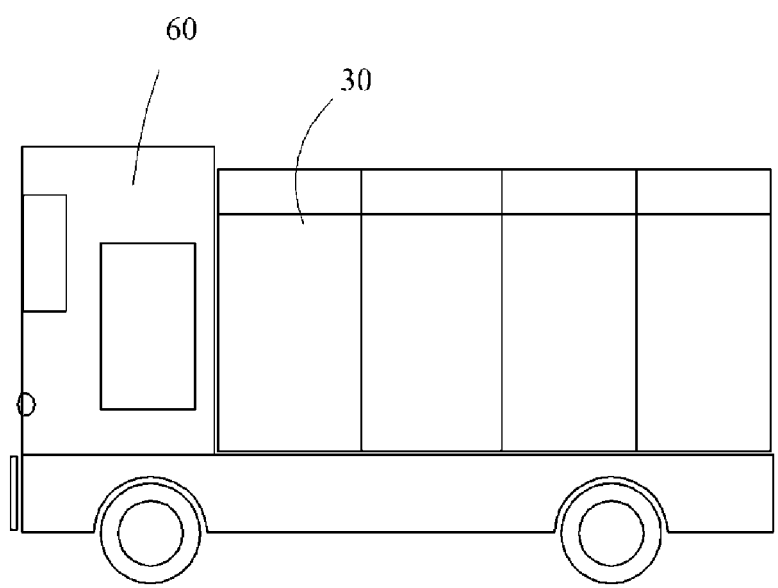
FIG. 14 is a schematic view showing a first embodiment of a cold-charging type truck box/cargo container included logistic truck according to the disclosure.

Referring to FIG. 14, which is a schematic view showing a first embodiment of a cold-charging type truck box/cargo container included logistic truck according to the disclosure, the logistic truck 60 may receive one or more temperature-keeping boxes 30 positioned thereon. When the logistic truck has completed cargo shipment and has returned back to the transfer station, the cold energy of the cold accumulator 33 of the cold storage chamber 32 of the temperature-keeping box 30 has been generally consumed up and the interior temperature has risen. Thus, the temperature-keeping box 30 can be opened to remove products for being stored at other sites (or a vacant box). For being ready to use in the next day, the first fast connector 22 of the first delivery tube 21 of the freezer 20 is connected to the first connector 34 of the temperature-keeping box 30 to deliver cold energy into the cold storage chamber 32 to freeze the cold accumulator 33 until the next morning. During the freezing process, the second fast connector 24 of the second delivery tube 23 is set in connection with the second connector 35 to deliver the air that has been subject to heat exchange to the outside. Under this condition, when the freezing operation is completed, the products can be moved back into each temperature-keeping box of the truck box 11 for subsequent delivery. The operation is similar to what shown in FIG. 9.

Figure 15:
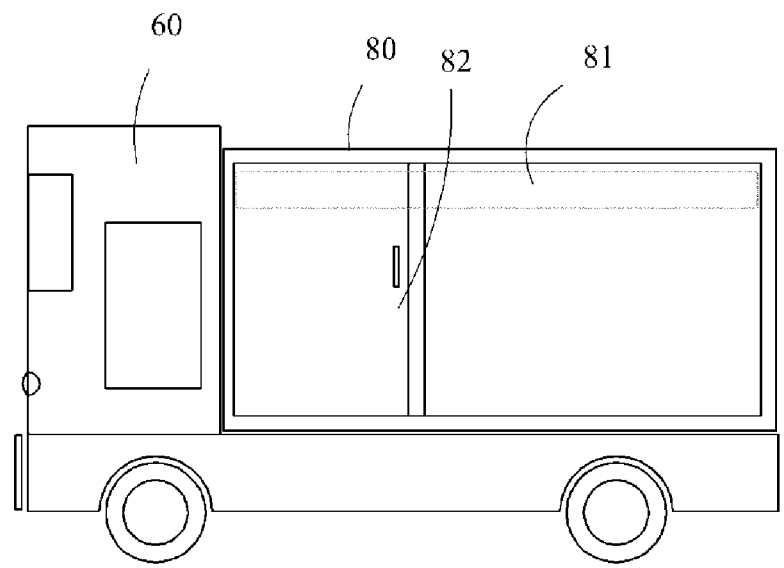
FIG. 15 is a schematic view showing a second embodiment of a cold-charging type truck box/cargo container included logistic truck according to the disclosure.

Referring to FIG. 15, which is a schematic view showing a second embodiment of a cold-charging type truck box/cargo container included logistic truck according to the disclosure, the logistic truck 60 may receive an exhibition cabinet 80 positioned thereon. The exhibition cabinet 80 comprises a cold storage chamber 81 arranged the top thereof. The cold storage chamber 81 receives one or more cold accumulators. The exhibition cabinet 80 has one side to which a glass door is mounted and can be opened through sliding motion for deposition and removal of food products in a convenient way.

A wall of the exhibition cabinet, which corresponds to the cold storage chamber 81, is provided with fast connectors connectable with deliver tubes of a freezer for timely supplement of cold energy for cold storage.

Figure 16:
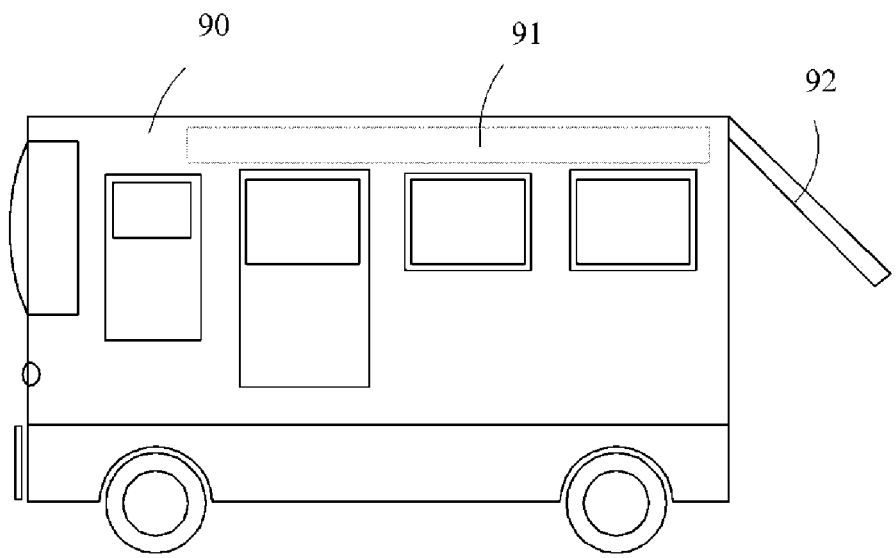
FIG. 16 is a schematic view showing a third embodiment of a cold-charging type truck box/cargo container included logistic truck according to the disclosure.

Referring to FIG. 16, which is a schematic view showing a third embodiment of a cold-charging type truck box/cargo container included logistic truck according to the disclosure, the logistic truck 90 can be a van. The van comprises, in a top portion of the interior thereof, a cold storage chamber 91. The cold storage chamber 91 receives one or more cold accumulators. The van has a rear end where a lift door is mounted for being lifted up to allow deposition and removal of food products in a convenient way.

A wall of the van, which corresponds to the cold storage chamber 91, is provided with fast connectors connectable with deliver tubes of a freezer for timely supplement of cold energy for cold storage.

The boxes or cabinets discussed in the above embodiments are made of thermal insulation materials.

In the above embodiments, the first delivery tube and the second delivery tube can be manufactured to be in the form of a side-by-side arrangement or can be manufactured as a combined arrangement that comprises the first delivery tube and the second delivery tube.

In summary, the disclosure allows freezing of cold accumulators to be completed at every morning. After cargos have been transported from the transfer station to a destination and return has been made to the transfer station, a freezer is operated to supply cold energy to the cold storage chamber to freeze the cold accumulators for being ready for use in the next day.

Although the disclosure has been described with reference to the preferred embodiments thereof, it is apparent to those skilled in the art that a variety of modifications and changes may be made without departing from the scope of the disclosure which is intended to be defined by the appended claims.

What is claimed is:

1. A cold-charging type truck box/cargo container, characterized by comprising:
   a truck box, which comprises one or more temperature-keeping chambers and a cold storage chamber arranged to correspond to a top of the temperature-keeping chambers, the cold storage chamber receiving therein one or more cold accumulators, wherein a wall of the truck box corresponding to the cold storage chamber is provided with a connector; and
   a freezer, which comprises a delivery tube and a freezing system, the delivery tube having a first end connected to the freezing system, the delivery tube having a second end connected to a fast connector;
   wherein connection is selectively made between the connector and the fast connector to allow the freezing system to supply cold energy through the delivery tube into the cold storage chamber to freeze the cold accumulators.

2. The cold-charging type truck box/cargo container as claimed in claim 1, characterized in that the truck box has a side on which a door panel is mounted and the truck box has a rear end to which a rear door panel is mounted, the door panels respectively corresponding to the temperature-keeping chambers.

3. The cold-charging type truck box/cargo container as claimed in claim 1, characterized in that the cold storage chamber comprises a lift door to allow one or more cold accumulators to be deposited into the cold storage chamber.

4. The cold-charging type truck box/cargo container as claimed in claim 1, characterized in that the truck box is divided into a first temperature-keeping chamber, a second temperature-keeping chamber, and a third temperature-keeping chamber, the second temperature-keeping chamber and the third temperature-keeping chamber being arranged to juxtapose each other at one side of the first temperature-keeping chamber; the first temperature-keeping chamber is adjacent to one side of the truck box; and the first temperature-keeping chamber is provided with a first door panel, the first door panel being composed of top and bottom door panels, the truck box being provided at a rear end thereof with a second door panel corresponding to the second temperature-keeping chamber; the third temperature-keeping chamber is provided with a third door panel.

5. The cold-charging type truck box/cargo container as claimed in claim 1, characterized in that the connector is mounted to a wall of the truck box and in communication with the cold storage chamber.

6. The cold-charging type truck box/cargo container as claimed in claim 4, characterized in that a dual-panel transparent glass door is arranged at an inner side of the first door panel of the first temperature-keeping chamber.

7. The cold-charging type truck box/cargo container as claimed in claim 1, characterized in that the first end of the delivery tube is connected to an evaporator of the freezing system to allow cold energy generated by the evaporator to be delivered through the delivery tube.

8. The cold-charging type truck box/cargo container as claimed in claim 1, characterized in that the truck box comprises a partition board mounted therein to form the a first, a second, and a third temperature-keeping chambers and a cold storage chamber in such a way that the first, second, and third temperature-keeping chambers are located at a lower side, while the cold storage chamber is located above the temperature-keeping chambers; and corresponding to each of the temperature-keeping chambers, the partition board comprises an opening formed therein, the opening comprising a closure member to selectively close the opening.

9. The cold-charging type truck box/cargo container as claimed in claim 8, characterized in that each of the cold storage chamber corresponds to each of the temperature-keeping chambers and separation plates are provided with at least one through hole, the through hole comprising a closure member to selectively close the through hole.

10. A temperature-keeping box, characterized by comprising at least one temperature-keeping chambers and at least one cold storage chamber, the cold storage chamber comprising one or more cold accumulators received therein, the cold storage chamber comprising a third connector and a fourth connector corresponding to a temperature-keeping box wall; and a freezer, which comprises a first delivery tube and a second delivery tube, the first delivery tube and the second delivery tube being respectively provided with a first fast connector and a second fast connector for respectively connecting with the third connector and the fourth connector so as to achieve connection with the freezer through the first delivery tube and the second delivery tube.

11. The temperature-keeping box as claimed in claim 10, characterized in that the temperature-keeping chamber and the cold storage chamber comprise an intermediate partition board arranged therebetween, the intermediate partition board comprising a plurality of through holes formed therein so that cold energy of the cold accumulators is allowed flow down through the through holes into the temperature-keeping chamber.

12. The temperature-keeping box as claimed in claim 10, characterized in that the cold storage chamber of the temperature-keeping box comprises a partition board corresponding to the temperature-keeping chamber to divide the temperature-keeping chamber and the cold storage chamber into two, the partition board comprising a through hole formed therein.

13. The temperature-keeping box as claimed in claim 10, characterized in that a pallet is provided under the temperature-keeping box, a push board being provided under the pallet, the push board having an underside to which four casters are mounted for easy moving of the temperature-keeping box.

* * * * *